May 22, 1962   P. H. ROSSITER   3,035,306
DEWATERING MEANS FOR PLASTIC MATERIALS
Filed Dec. 1, 1959   3 Sheets-Sheet 1
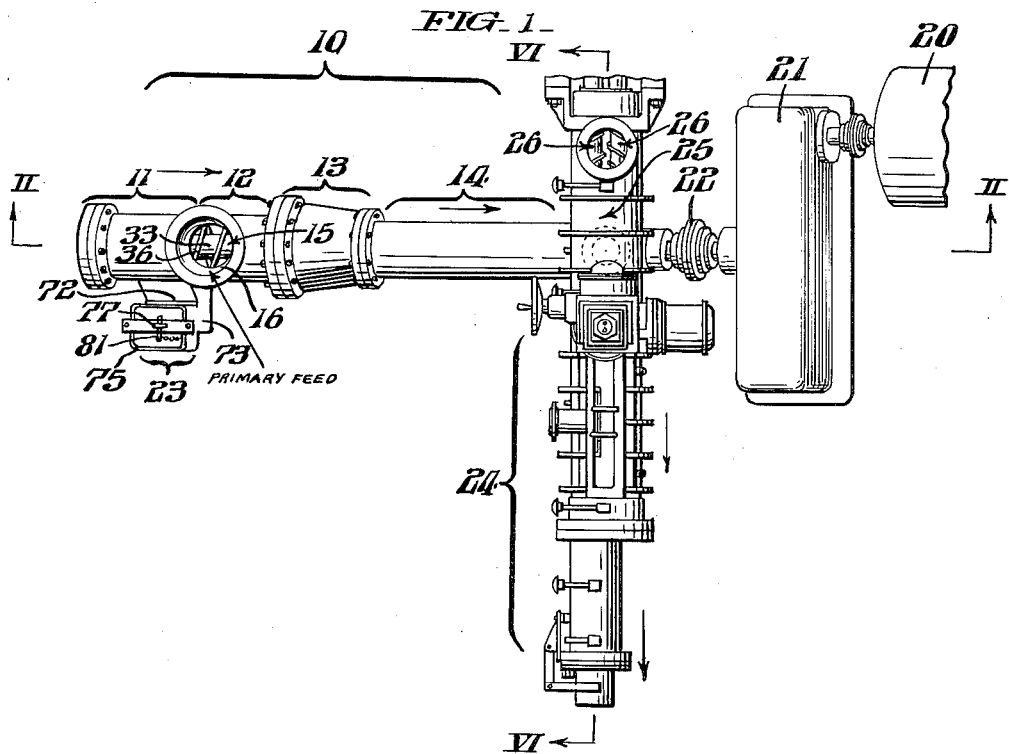
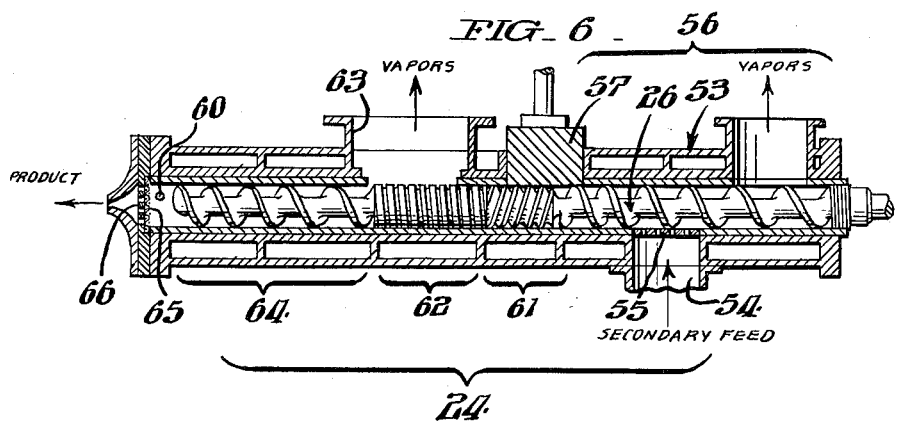
INVENTOR.
Paul H. Rossiter,
BY Paul & Paul
ATTORNEYS.

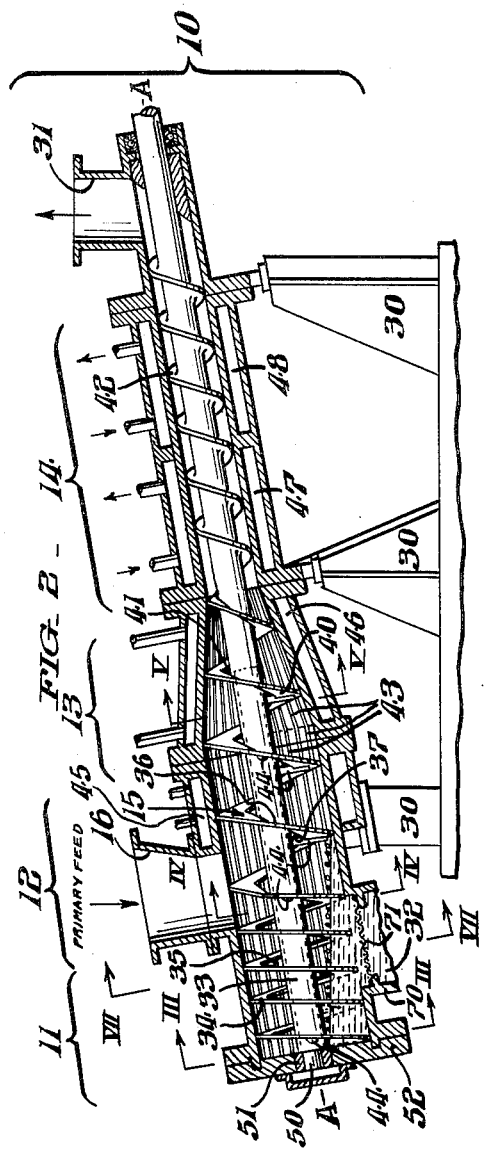
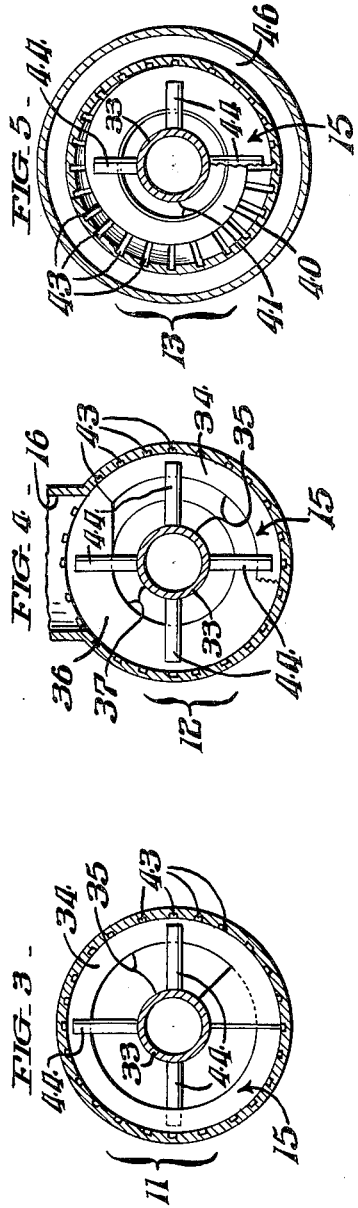

May 22, 1962 P. H. ROSSITER 3,035,306
DEWATERING MEANS FOR PLASTIC MATERIALS
Filed Dec. 1, 1959 3 Sheets-Sheet 3

INVENTOR.
Paul H. Rossiter,
BY Paul & Paul
ATTORNEYS.

United States Patent Office 3,035,306
Patented May 22, 1962

3,035,306
DEWATERING MEANS FOR PLASTIC
MATERIALS
Paul H. Rossiter, Paoli, Pa., assignor to Welding Engineers, Inc., Norristown, Pa., a corporation of Delaware
Filed Dec. 1, 1959, Ser. No. 856,561
15 Claims. (Cl. 18—12)

This invention relates to an apparatus for dewatering plastic materials of various types. For example, in the production of processed rubber and various synthetic materials, the product often contains water in varying portions. Sometimes the starting material contains as much as 50% by weight of water or even more, and it is often desired to remove the water until the product contains less than about 1% by weight of residual moisture.

For some time it has been the accepted commercial practice to extrude plastics and the like by utilizing one or more worms rotating in a barrel, thus causing a heating and working of the plastic which can be utilized for the purpose of removing moisture from the plastic. One such apparatus which has been highly successful for accomplishing this end is shown and claimed in the Fuller Reissue Patent No. 23,948, granted to the assignee of this application on February 15, 1955.

When efforts are made to utilize the apparatus that is shown in the aforementioned Fuller reissue patent, to remove substantial quantities of water from material such as rubber particles or the like, the presence of excessive quantities of water seriously impedes the efficiency of the apparatus, such that when efforts are made to enlarge the scale of the feed end of the extrusion dryer shown in the Fuller reissue patent, the mere enlargement of parts has been found to be an inadequate solution to the problem of removing excessive quantities of drainable water such as in the order of 50% by weight more or less.

It is, accordingly, an object of this invention to provide an apparatus and method for removing very substantial quantities of water from a pliable material, and to process such pliable material to a substantially moisture-free condition while concurrently rendering such material uniform in consistency.

Another object of this invention is to provide an apparatus of a continuously operative nature which has ability to remove the water to a degree of less than about 1% by weight of residual moisture, with reliability and efficiency.

Other objects and advantages of this invention, including the ready adaptability of the same for use with varying existing equipment types, and the ease with which parts may be removed and replaced, all will become apparent hereinafter, having reference to the drawings in which:

FIG. 1 is a plan view of a specific form of apparatus which embodies features of this invention, showing the dewatering extruder arranged at approximately a 90° angle to the longitudinal axis of the extrusion dryer.

FIG. 2 represents a sectional view taken generally as indicated by the lines and arrows II—II which appear in FIG. 1, with the worm portion of the apparatus shown in full elevation. In this figure, the broken line at the lower left hand portion of the apparatus indicates that a drainage portion, shown in others of the figures, has been broken away for the sake of clarity of illustration.

FIGS. 3, 4 and 5 are sectional views respectively taken as indicated by the lines and arrows III—III, IV—IV and V—V which appear in FIG. 2.

FIG. 6 is a sectional view of the extrusion dryer portion of the apparatus shown in FIG. 1, and is taken generally as indicated by the lines and arrows VI—VI which appear in FIG. 1, with the worm portion shown in full elevation.

Figure 7:
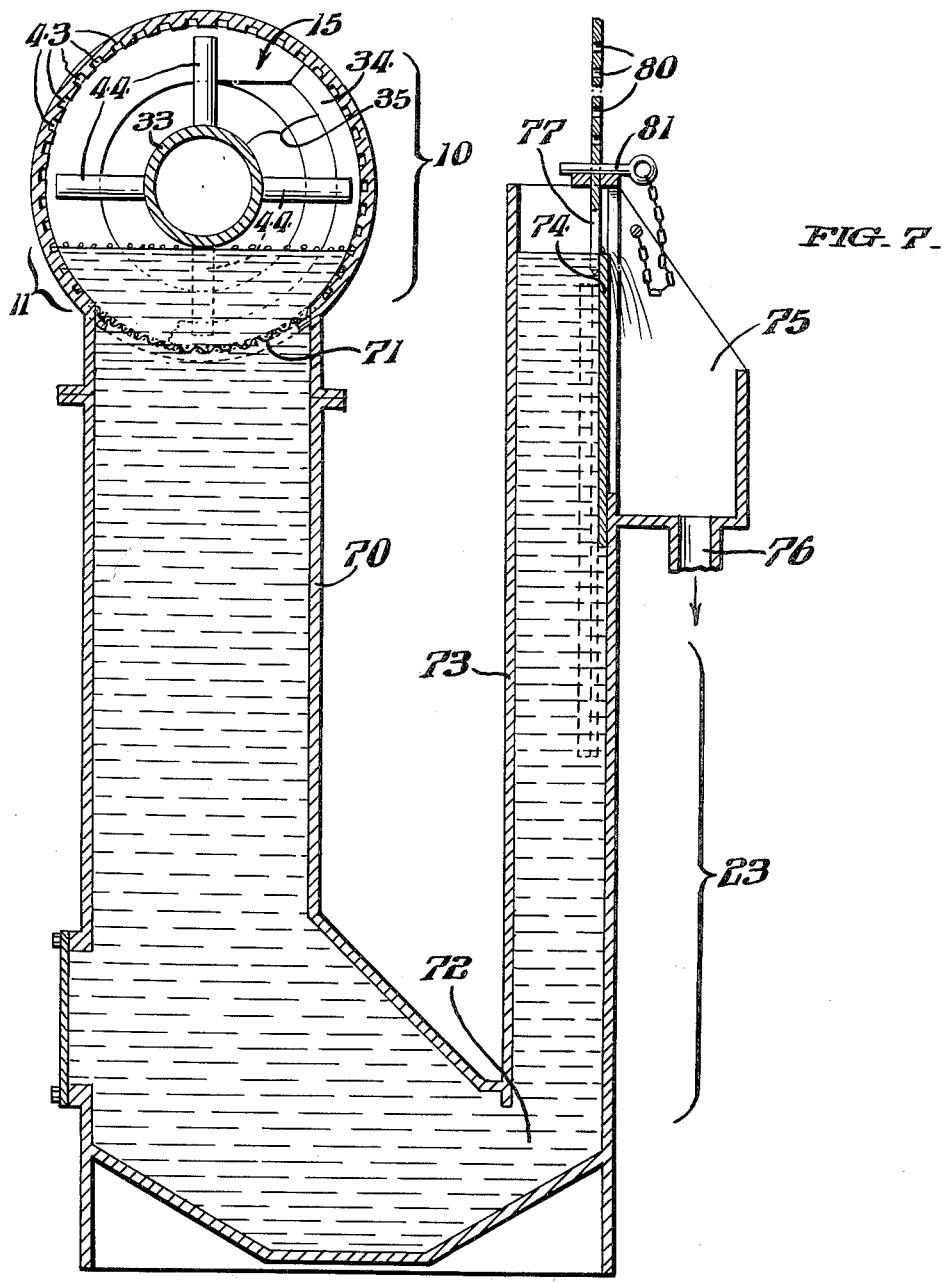
FIG. 7 is an enlarged sectional view looking generally as indicated by the lines and arrows VII—VII which appear in FIG. 2 and shows the drainage control portion of the apparatus that is associated with the dewatering extruder section of the apparatus.

Referring now to the specific form of the invention as shown in the drawings, the number 10 designates generically a dewatering extruder having a drainage section 11, a feed section 12, a compression section 13, and an extruder section 14. Each of these sections includes a surrounding barrel and a worm section which is rotatable within the barrel. In FIG. 1, a portion of the worm 15 may be seen through a primary feed opening 16.

In FIG. 1, there is shown a drive means for causing the worm 15 to be rotated within the barrel. This drive means includes a motor 20, a gear reducer 21 and a coupling 22 which is connected to drive the end of the shaft of the worm 15.

In FIG. 1, the number 23 designates generically a drainage control apparatus, the details of which appear more particularly in FIG. 7 of the drawings and will be discussed more particularly hereinafter.

FIG. 1 also shows an extrusion dryer generically indicated by the number 24 which, as shown, includes a barrel 25 and a pair of twin worms 26, 26 that are longitudinally arranged within the barrel and are rotatable about their longitudinal axes. Although the extrusion dryer may be of any desired form, having the ability to heat and work the plastic material in order to provide for the removal of moisture by vaporization, it is particularly preferred to provide an extrusion dryer of the type that is shown and described in the patent to Fuller No. 2,615,199, for example. (Reissue Patent No. 23,948, reissued February 15, 1955.)

Turning now to FIG. 2 of the drawings, it will be seen that the barrel is supported upon supports 30 in such a manner that the longitudinal axis AA of the worm is inclined at an angle to the horizontal. The apparatus includes an outlet opening 31 which is located at a level above that of the primary feed opening 16, and a drain opening 32 is provided near the bottom of the apparatus, well below the primary feed opening 16.

The number 33 designates the stem of the worm which, as shown, has a substantially constant diameter throughout its length. In the drainage section 11, the worm 33 is surrounded by a generally helically arranged ribbon section 34 which is spaced away from the outside surface of the stem 33, leaving an intervening free space 35 therebetween. As shown in the drawings, the worm in the drainage section has a constant pitch. However, in many instances the pitch may be varied. Although the back flow clearance space 35 is preferably constant and at a maximum in the drainage section 11, the back flow clearance space may be varied if desired.

In the feed section 12, the ribbon section 36 has a greater pitch than the ribbon section 34, but this is a preferred form of the apparatus and the pitch may be adjusted to any desired value including the same pitch as that of the ribbon section 34. Also, the depth of the flight ribbon, or its radial dimension, is shown to be greater in the ribbon section 36 than in the ribbon section 34, leaving a back flow clearance space 37 which is smaller than the back flow clearance space 35 in the drainage section 11. Here again, this is a preferred form of the invention and is not intended to be a limiting factor with respect to the broad aspects of the invention.

In the compression section 13, it will be observed that the flights 40 gradually decrease in diameter, together with a corresponding decrease in the inside diameter of the barrel. There is also, as shown, a gradual reduction in the area of the back flow clearance space 41.

The extrusion section 14 is a section in which there is no back flow clearance space, but wherein the worm flights 42 are solid and are in a close running relationship with the inside surface of the barrel.

As will be seen in FIG. 2, the sections 11, 12 and 13 have a longitudinally grooved barrel, the grooves 43 being provided. As appears in FIGS. 3, 4 and 5, these grooves are generally of rectangular cross-section, wider than their depth, and are equally spaced around the periphery of the barrel. FIGS. 3, 4 and 5 also show a plurality of radially arranged rods 44 which are secured to the worm stem 33 and to the worm flights 34, 36 and 40 in order to space such flights away from the surface of the stem 33.

As appears clearly in FIG. 2, several jackets 45, 46, 47 and 48 are provided respectively in the sections 12, 13 and 14 of the dewatering extruder, providing for the introduction and withdrawal of temperature controlling media such as water and steam. For example, when rubber is being dewatered, water is preferably introduced into the jackets 45, 46 whereas steam is preferably introduced into the jackets 47, 48.

It will be appreciated that the right hand end of the stem 33, as it appears in FIG. 2, is connected to the drive coupling 22 heretofore described, providing for the rotation of the worm in the desired direction under the influence of the motor 20 operating through gear reducer 21. At its opposite end, the worm shaft has a stud 50 running in a bushing 51 in a cover plate 52. This construction is advantageous inasmuch as the cover plate 52 may be hinged to the barrel of the drainage section 11 and may be opened up at will, providing for the ready removal of the worms from sections 11, 12, 13 and 14. Preferably, though not essentially, the worm sections in the sections 11, 12, 13 and 14 are separately constructed and keyed to one another so that any section may readily be replaced by a substitute section, without requiring the construction of a complete worm.

Referring now to FIG. 6 of the drawings, it will be appreciated that the worms of the extrusion dryer there shown may consist of a wide variety of sections, a preferred form being shown. The barrel 53 as shown in FIG. 6 has a constant diameter throughout, and is constructed to accommodate two worms one of which is longer than the other. A secondary feed opening 54 is provided for introducing the material that has been processed by the dewatering extruder 10. Inside the secondary feed opening 54 is a die 55 which functions to break up the material as it is being fed into the feed section 56 of the extrusion dryer. An adjustable pressure plug 57 is provided in the extrusion dryer, which is movable toward and away from the axis of the worm, in order to provide greater or less resistance to the flow of the plastic material longitudinally within the barrel. Means are provided for automatically regulating the position of the adjustable pressure plug 57, preferably in response to variations of temperature of the product. For example, it is preferred to install a thermocouple 60 at the product end of the extrusion dryer, and to connect such thermocouple to an electric motor or the like which functions to regulate the movement of the adjustable pressure plug 57 up and down automatically in response to variations of temperature of the product.

The section 61 is a section having a reverse pitch worm, while the section 62 is a milling section wherein vapors are flashed off and the material is kneaded by the worms in the section 62 in order to masticate the material to allow for the elimination of all possible vapor through the vapor opening 63.

The section 64 is a delivery section, forcing the product through a screen 65 and a die 66.

The extruder dryer shown in FIG. 6 is equipped with a plurality of separate jackets which are in heat exchanging relationship with the material being processed by the worm and which serve normally to heat such material in order to assist in driving off the water vapor in the compounding section 62. Normally hot oil or any other heating means may be used.

FIG. 7 shows the structure of the drainage control apparatus that is installed at the lower end of the dewatering extruder, as appears in FIG. 2. It will be observed that a conduit 70 is provided, having a screen 71 preferably extending across the upper portion of the conduit 70, just below the worm.

The conduit 70 extends downwardly to a restricted throat 72 which has a smaller area than the area of the conduit 70. An upwardly arranged conduit 73 extends to a level higher than the level of liquid in the drainage section 11 of the dewatering extruder 10. A weir 74 is provided, forming an overflow for the liquid, which flows upwardly and over the weir 74 into a drain box 75 and through a drainpipe 76. Means are provided for adjusting the level of the weir 74. The weir 74 is affixed to plate 77, plate 77 having a series of holes 80 through which a pin 81 may be inserted, in a manner to regulate the height of the weir at various levels. This, of course, regulates the height of liquid in the drainage section 11 of the dewatering extruder 10.

It is of particular advantage that the drive means 20, 21, 22 may be mounted at the upper end of the inclined dewatering extruder 10. Because of the gradual reduction of diameter in the compression section 13, it is necessary to withdraw the worm from the lower portion of the apparatus if it is desired to inspect or repair either the worm or the internal portions of the barrel. Accordingly, due to locating of the drive means at the upper end of the barrel (the end of lesser diameter), it is only necessary to open up the larger and lower end and to remove the sections of the apparatus as may be necessary.

A typical successful construction is of 16 inch diameter bore throughout the straight portion of the barrel at the primary feed entrance, the straight portion being about 54 inches long and the feed opening being approximately in the center. The compression section 13 is then about 24 inches long and tapers from the 16 inch bore down to an 8½ inch bore which latter is the bore for the extrusion portion 14. The rear helical ribbon has a pitch of 6 inches and the radial width of the ribbon is 2 inches to 3 inches leaving a clearance 35 of 3½ inches to 2½ inches between the inner edge of the ribbon and the outside diameter of the stem which is 5 inches in diameter. The helical ribbon in the feed portion 12 has a pitch of 12 inches and has a radial width of 4 inches leaving a radial clearance 37 of 1½ inches. The grooves in this part of the apparatus will be ½ inch wide by ¼ inch deep. In the compression section 13 the pitch and radial width of the ribbon and clearance between the inside diameter of the ribbon and the outside diameter of the stem, all gradually decrease with the radial backflow clearance 41 between the inner edge of the ribbon and the outer surface of the stem running out about midway in this zone and a solid flight continuing for the remaining down stream portion. In the extrusion section 14 a conventional extrusion screw of 8½ inches diameter of 5 inches suffices. This unit can process 4,000 pounds per hour and upward of wet butyl rubber crumb when the worm is turning at 32 r.p.m.

In such typical successful construction, the extrusion dryer has twin 6 inch worms and the worms rotate between 150 and 300 r.p.m. to handle the final evaporative drying of 4,000 pounds per hour and upward. Accordingly, it will be appreciated that it is highly preferred to rotate the worms of the dewatering extruder slowly compared to the speed of the extrusion dryer, preferably at a speed in the range of 10% to 20% of the speed of rotation of the worm or worms in the extrusion dryer.

However, in other embodiments of the invention, different speed ratios may be used.

In operation, the feed material is introduced at the opening 16, in a moist or wet condition. The continuous revolution of the stem and ribbon flights causes the gradual advancement of the solid particles, until they are compressed by the action of the compression section 13, thereby squeezing out large quantities of water. The water flows through the intervening spaces 35, which are between the outer periphery of the stem and the inside diameter of the ribbon flights. The water flows rearwardly toward the drainage portion 11, forming a level as is indicated in FIG. 2 of the drawings. Meanwhile, the solid material advances forwardly into the extrusion section 14, and is forced upwardly through the opening 31 into the inlet opening or secondary feed opening 54 of the extrusion dryer 56. The material then flows through the respective sections of the extrusion dryer, eliminating vapors at the opening 63, with the ultimate extrusion of the processed material through the die 66.

Thus is successfully performed the task of receiving a single continuous stream of wet polymer, such as equal parts of synthetic rubber and water, and separating the components of this stream in such a way that the water and the rubber are divided into two streams and each one issues separately from the other, the rubber, which still contains a small percentage of water cannot be squeezed out, continues for subsequent treatment in the process while the squeezed out water is discarded from the process. In its progress through these processing steps the rubber has been gradually compacted together into a relatively solid mass while the water has been squeezed out except for a small percentage, usually less than 10% and sometimes as low as 5%, which becomes kneaded throughout the mass due to the working and mixing that occurs in the squeezing out of the water and the subsequent working of the material as it is put under pressure and ejected from this step in the process. Also the temperature of the rubber is raised both from the frictional working and from heat which may be applied through the jackets 47, 48. The hot, masticated material containing only a relatively small percentage of water is now ideally suited for final drying by further mastication.

Upon issuance of the material through the die 55 of the secondary feed opening 54, vapors will commence evaporating from the hot rubber and will pass off to the atmosphere, or to a vacuum. An elevated pressure may be used if it is desired to restrain the flashing at this point.

As the material is advanced by the twin worms 26, 26, it is again compacted and put under pressure, masticated and heated until it is released from pressure and the final moisture evaporated and passes out through vapor release area 63. The material is again compressed and extruded through die 66.

It is clear that the material is subjected to a first treatment which removes the drainable water and compacts, masticates and heats the rubber. The material which issues from this first treatment is in a condition suitable for evaporation of the water and is accordingly subjected to appropriate treatment to masticate the rubber while the water is being evaporated.

Accordingly, it will be appreciated that this invention involves a method of separating a drainable liquid from a solid containing such liquid, wherein the material is compacted and squeezed while continuously moving in a predetermined downstream direction, thereby separating at least a portion of the liquid from the material, and the separated liquid is caused to flow upstream continuously in a direction opposite to the flow of the solid material. The liquid thus separated is then continuously removed, the resulting material and the remaining liquid are then subjected continuously to high pressure mastication while retaining and heating the solid and the residual liquid, and then the resulting material is conveyed to an area of lower pressure, vaporizing the heated liquid.

As shown in the drawings, the resulting material is fed into the extrusion dryer where it is again subjected to mastication, pressure and heating but with the retention of liquids while converting at least a portion of such liquids to vapor, and the product is released to an area of lower pressure for the evaporation of the liquid in vapor form. Finally, the solids are discharged under pressure from the process.

It will be appreciated that it is not absolutely necessary to mount the dewatering extruder 10 and the extrusion dryer 56 at right angles to one another when viewed in plan, as in FIG. 1. However this arrangement is particularly advantageous because of the ready accessibility of parts, particularly where the extrusion dryer is located at a level above the exit end of the dewatering extruder 10.

It will be appreciated that the solid particles which are contained in the feed are sometimes broken down into exceedingly fine particles which have heretofore been lost in the drainage water. It is a highly advantageous feature of this invention that these particles are caught on the surface of the liquid as appears in FIG. 2, and the revolution of the ribbon flight 34 picks up these fine particles which are floating on the surface of the liquid and gradually advances them to the feed section 12, where they are taken up by additional feed material and are ultimately advanced through the compression section 13 into the extrusion section 14. Thus, the loss of substantial quantities of material is positively avoided.

The exceedingly small amounts of material that may escape the action of the ribbon flight 34 will be found to move downwardly through the conduit 70 and then, at accelerated velocity, upwardly through the conduit 73 and over the weir. The reduction of throat area 72 accelerates the movement of the exceedingly small quantities of fine materials, thereby avoiding their settling out at the bottom of the conduit 70 or 73.

Among its other advantages, the apparatus in accordance with this invention, comprising the combination of a dewatering extruder and an extrusion dryer, offers for the first time an efficient method of drying wet rubber by mechanical means. Heretofore, other mechanical devices particularly of the extrusion type, suffered serious operating problems which increased in difficulty with increase in size of the equipment. For example, in attempting to operate the single screw or double screw drying extruders at the rate of 1500 pounds per hour, difficulties were encountered, and in attempting to get rates in the range of 4000 pounds per hour, the problems were acute. These difficulties manifested themselves as low output rates compared to that which would have been expected, and large variations in rate as the level of throughout was increased. Moreover, it was found that operating results could not be reproduced.

Although it is not absolutely essential, it is believed that the initial squeezing of the wet crumb which forces out the drainable water and simultaneously compacts the rubber and commences to heat it, is best carried out at a relatively slow speed, and with the provision of large water drainage passages, as has been described herein. The extrusion dryer, on the other hand, preferably operates at a relatively high speed in order to bring about the heating of the material, the flashing of the vapor and the normal extrusion of the rubber.

It has been found that, according to this invention, throughout rates may be obtained which are radically in excess of the throughput rates that would be expected from the sum of the effects of the dewatering extruder and the extrusion dryer taken individually. Thus, a system which fails to operate satisfactorily at rates of 3000/4000 pounds of rubber per hour has been replaced by a system which readily produces as much as 5000 pounds of rubber per hour and can readily be designed for considerably higher rates.

It will be appreciated that a wide variety of changes may be made without departing from the spirit or scope of this invention. For example, the jacketing on the dewatering extruder is for cooling water but is optional—its use depends upon whether the working of material gives off excessive heat. Moreover, instead of feeding the material angularly from the exit of the dewatering extruder to the inlet of the extrusion dryer, the material may readily be cut into bits by using a conventional cutting knife at the exit end of the dewatering extruder, and the bits may be allowed to drop down into the feed of the extrusion dryer. Further, although the worm contained in the extrusion section 14 of the dewatering extruder may be a continuation of the worm in the compression section 13, this is not necessary inasmuch as the respective sections may be separately fabricated and then joined together in any desired manner. However, in function, the flight in the dewatering extruder preferably operates as one continuous uninterrupted flight. Although the drawings, and particularly FIG. 7 thereof show a screen near the top of the downwardly extending conduit 70, this screen is often not needed for light materials such as rubber for example. Such materials frequently float on the surface of the liquid to such an extent that the screen may be dispensed with.

Although FIG. 6 shows a specific form of apparatus including the reverse pitch worm 61, it will be appreciated that various modifications may be made in the form of this apparatus. For example, a plain cylindrical section may be substituted for the section 61. Various other changes may be made in the extrusion dryer that appears in FIG. 6.

Although reference has been made in the foregoing specification to the separation of water from a solid material, it is to be appreciated that this invention applies broadly to the separation of any liquid which can be squeezed and drained out of a solid material. It is to be understood expressly, however, that where in the specification and claims we refer to a "dewatering extruder," to the step of "dewatering," and generally to the removal of water from solids, such expressions are intended to be broad enough to cover the removal of any liquid as the full equivalent of the removal of water.

Although the apparatus shown in the drawings and described herein is particularly adapted for the separation of a liquid from a solid which is lighter than the liquid, it is to be understood that this invention is similarly applicable to the separation of solids which are heavier than the liquid.

Although the drawings show a preferred form of the invention, wherein the dewatering extruder is inclined, preferably at an angle of about 10°, it is to be understood that the degree of inclination can be varied within wide limits depending upon the particular nature of the process that is being carried out, and in some cases it is possible to arrange the axis of the dewatering extruder along a horizontal line. In some cases, the axis of the dewatering extruder may be directed downwardly, with the feed end higher than the exit end. This is particularly true when the solid is heavier than the liquid.

It will further be appreciated that many other changes may be made, including the substitution of equivalent elements for those specifically shown and described, the use of certain features independently of the use of other features, and the reversals of parts, all such changes being made without departing from the spirit or scope of the invention as defined in the appended claims.

While the drawings and foregoing specification show and describe a compression section 13 wherein the flights are partially open (having a clearance 41) and partially closed, it will be understood that this compression section 13 may in appropriate instances have entirely open or entirely closed flights. Moreover, the proportion of open flight to closed flight may be varied as desired depending on specific processing conditions.

It is claimed:

1. A dewatering extruder for removing water from a solid mouldable material containing drainable water, comprising a barrel the longitudinal axis of which is longitudinally inclined, said barrel having a bore means forming a feed opening located at a lower portion of said barrel for introducing said particles into said barrel, means forming an outlet for said material at an upper portion of said barrel, said outlet being at a level higher than said inlet opening, means forming a drain opening below said feed opening, a stem extending longitudinally in said barrel, and a ribbon flight which is substantially helically disposed about said stem in close-running relation to the bore of said barrel, said ribbon flight being spaced radially away from said stem, providing intervening space therebetween and a compression section comprising a worm having a closed flight arranged to receive material from said ribbon flight.

2. A dewatering extruder for removing water from a solid mouldable material containing drainable water, comprising a barrel, means forming a feed opening in said barrel for introducing said particles into said barrel, means forming an outlet for said material, outlet means forming a drain opening below said feed opening, a stem extending longitudinally in said barrel, and a ribbon flight which is substantially helically disposed about said stem, said ribbon flight being spaced radially away from said stem, providing intervening space therebetween, said ribbon flight including a feed section a compression section wherein the outside diameter of the ribbon flight gradually decreases, the flights of said compression section being closed, and said compression section being arranged to receive material from said feed section.

3. A dewatering extruder for removing water from a solid mouldable material containing drainable water, comprising a barrel, means forming a feed opening in said barrel for introducing said particles into said barrel, means forming an outlet for said material, means forming a drain opening below said feed opening, a stem extending longitudinally in said barrel, and a ribbon flight which is substantially helically disposed about said stem, said ribbon flight being spaced radially away from said stem, providing intervening space therebetween, and said barrel and ribbon flights being formed into (1) a drainage section wherein the outer diameter of said ribbon flight is substantially constant, (2) a feed section wherein the outer diameter of said ribbon flight is substantially the same as in said drainage section but the pitch is greater, and (3) a compression section wherein the outer diameter of said ribbon flight gradually decreases and wherein at least a portion of said flight is closed.

4. A dewatering extruder for removing water from a plurality of solid mouldable particles containing water, comprising a longitudinally inclined barrel, means forming a feed opening located at a lower portion of said barrel for introducing said particles into said barrel, means forming an outlet for said particles at an upper portion of said barrel, said outlet being at a level higher than said inlet opening, means forming a drain opening below said feed opening, a stem extending longitudinally in said barrel, and a ribbon flight which is substantially helically disposed about said stem, said ribbon flight being spaced radially away from said stem, providing intervening space therebetween, said barrel and ribbon being composed of successive sections comprising (1) a drainage section located above said drain opening, (2) a feed section communicating with said feed opening, (3) a compression section wherein the inner diameter of the barrel and the outer diameter of the ribbon both gradually decrease and wherein the free space between the ribbon flight and the stem also decreases with a portion of said flight completely closed, and (4) an extrusion section wherein the flights are closed.

5. A dewatering extruder for removing water from a plurality of solid mouldable particles containing water, comprising a longitudinally inclined barrel having a plurality of longitudinally extending grooves therein, means forming a feed opening located at a lower portion of said barrel for introducing said particles into said barrel, means forming an outlet for said particles at an upper portion of said barrel, said outlet being at a level higher than said inlet opening, means forming a drain opening below said feed opening, said grooves extending along the area intermediate said feed opening and said outlet, a stem extending longitudinally in said barrel, and a ribbon flight which is substantially helically disposed about said stem, said ribbon flight being spaced radially away from said stem, providing intervening space therebetween.

6. The dewatering extruder defined in claim 5, wherein said grooves are rectangular in cross-section and each is wider than its depth.

7. A dewatering extruder for removing water from a plurality of solid mouldable particles containing water, comprising a barrel, means forming a feed opening for introducing said particles into said barrel, means forming an outlet for said particles, means forming a drain opening below said feed opening, a stem extending longitudinally in said barrel, a ribbon flight which is substantially helically disposed about said stem, and a plurality of radially extending supports fixed to said stem and to said flights whereby said ribbon flights are spaced radially away from said stem, providing intervening space therebetween, and a compression section comprising a worm having a closed flight arranged to receive material from said ribbon flight.

8. A dewatering extruder for removing water from a plurality of solid mouldable particles containing water, comprising a longitudinally inclined barrel, means forming a feed opening located at a lower portion of said barrel for introducing said particles into said barrel, means forming an outlet for said particles at an upper portion of said barrel, said outlet being at a level higher than said inlet opening, means forming a drain opening below said feed opening, a stem extending longitudinally in said barrel, a ribbon flight which is substantially helically disposed about said stem, said ribbon flight being spaced radially away from said stem, providing intervening space therebetween, and a drainage control apparatus attached to said drain opening including a conduit extending downwardly therefrom, said conduit having a restricted throat adjacent the bottom thereof, an upwardly extending conduit which attains an elevation greater than that of said drain opening, and means forming a weir adjacent the top of said upwardly extending conduit.

9. The extruder defined in claim 8, wherein the weir includes a level controlling plate that is movable up and down, and wherein means are provided for adjusting said weir in a plurality of different positions.

10. In a method of separating drainable liquid from a solid containing such liquid, the steps which comprise continuously compacting and squeezing an outer portion only of said material while moving said outer portion of said material generally helically forwardly along a predetermined axis, while the inner portion of said material is not directly squeezed, thereby separating said liquid from said outer portion, continuously causing said separated liquid to flow rearwardly in a direction opposite to the flow of said material and in a separate path through said inner portion of said material, increasing the squeezing pressure on said material thus accelerating liquid separation and continuously removing the liquid thus separated, continuously subjecting the resulting material and remaining liquid to high pressure mastication while retaining and heating said liquid, and then conveying said material to an area of lower pressure, vaporizing the heated liquid.

11. In a method of separating drainable liquid from a solid containing such liquid, the steps which comprise compacting and squeezing an outer portion only of said material continuously while moving said outer portion of said material generally helically forwardly along a predetermined axis thereby separating said liquid, while the inner portion of said material is not directly squeezed, continuously causing said separated liquid to flow rearwardly in an axial direction through said inner portion of said material substantially opposite to the flow of said material, increasing the squeezing pressure on said material thus accelerating liquid separation and continuously removing the liquid thus separated, continuously subjecting the resulting material and remaining liquid to high pressure mastication while retaining and heating said liquid, and then conveying said material to an area of lower pressure, vaporizing the heated liquid.

12. In a method of separating drainable liquid from a solid containing such liquid, the steps which comprise compacting and squeezing an outer portion only of said material continuously while moving said outer portion of said material generally helically forwardly along a predetermined axis, thereby separating said liquid, while the inner portion of said material is not directly squeezed, continuously causing said separated liquid to flow rearwardly in an axial direction through said inner portion of said material substantially opposite to the flow of said material, increasing the squeezing pressure on said material thus accelerating liquid separation and continuously removing the liquid thus separated, continuously subjecting the resulting material and remaining liquid to high pressure mastication while retaining and heating said liquid, conveying said material to an area of lower pressure, vaporizing the heated liquid, again subjecting the material to high pressure mastication but with the retention of liquids while converting said liquids to vapor, and releasing the resulting material to an area of lower pressure.

13. In a method of separating drainable liquid from a solid containing such liquid, said solid including fine particles which are lighter than said liquid, the steps which comprise compacting and squeezing said material continuously while moving said material continuously in a predetermined downstream direction, thereby separating said liquid but also liberating fine particles from the material, continuously removing the liquid thus separated while retaining a liquid level on said liquid, and continuously picking up said fine particles from said liquid level and advancing them continuously into the material which is being compacted and squeezed.

14. In a method of separating drainable liquid from a solid containing such liquid, said solid including fine particles which are lighter than said liquid, the steps which comprise compacting and squeezing said material continuously while moving said material continuously in a predetermined downstream direction, thereby separating said liquid but also liberating fine particles from the material, continuously causing said separated liquid to flow upstream in a direction opposite to the flow of said material, continuously removing the liquid thus separated while retaining a liquid level on said liquid, said fine particles floating at said level, continuously picking up said fine particles and advancing them continuously into the material which is being compacted and squeezed, continuously subjecting the resulting material and remaining liquid to high pressure mastication while retaining and heating said liquid, and then conveying said material to an area of lower pressure, vaporizing the heated liquid.

15. A dewatering extruder for removing water from a solid mouldable material containing water, comprising a longitudinally inclined barrel, means forming a feed opening located at a lower portion of said barrel for introducing said material into said barrel, means forming an outlet for said material at an upper portion of said barrel, said outlet being at a level higher than said inlet opening, means forming a drain opening below said feed opening, an inclined stem extending longitudinally in said barrel, a ribbon flight which is substantially helically disposed about said stem, said ribbon flight being spaced radially away from said stem, providing intervening space therebetween, at least a portion of said ribbon flight decreasing in outside diameter toward said outlet, with a portion of said flight substantially closed, drive means located beyond said outlet, and connecting means extending from said drive means and extending through said outlet to drive said stem.

References Cited in the file of this patent

UNITED STATES PATENTS

| | | |
|---|---|---|
| Re. 23,948 | Fuller | Feb. 15, 1955 |
| 1,083,013 | Hettinger | Dec. 30, 1913 |
| 2,371,722 | Wanderer | Mar. 20, 1945 |
| 2,397,758 | Sharp | Apr. 2, 1946 |
| 2,617,167 | Johnson | Nov. 11, 1952 |
| 2,709,956 | Napier | June 7, 1955 |
| 2,830,104 | Speckhardt et al. | Apr. 8, 1958 |
| 2,833,750 | Vickers | May 6, 1958 |